(12) United States Patent
Fujii et al.

(10) Patent No.: US 6,300,401 B1
(45) Date of Patent: Oct. 9, 2001

(54) MATERIAL HAVING A DAMPING PROPERTY AND MASTERBATCH PELLETS THEREOF

(75) Inventors: Yasuhiko Fujii, Ootake; Shigeru Takaragi, Hiroshima; Tetsuro Toda, Hiroshima; Tomohisa Moriya, Hiroshima, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/263,084

(22) Filed: Mar. 8, 1999

Related U.S. Application Data

(62) Division of application No. 08/855,012, filed on May 13, 1997, now Pat. No. 5,977,235, which is a continuation of application No. 08/496,914, filed on Jun. 29, 1995, now abandoned.

(30) Foreign Application Priority Data

Jun. 30, 1994 (JP) .................................................. 6-173637

(51) Int. Cl.$^7$ ................ C08K 3/22; C08K 3/18
(52) U.S. Cl. ................ 524/431; 524/435; 523/351
(58) Field of Search .................. 524/431, 435; 523/351

(56) References Cited

U.S. PATENT DOCUMENTS 4,690,960   9/1987   Yamauchi ........................... 524/431

FOREIGN PATENT DOCUMENTS 54845   6/1982   (EP) .
287652   12/1991   (JP) .
59233   3/1993   (JP) .

OTHER PUBLICATIONS

Matthews "Polymer Mixing Technology";1984 pp 225–226.
Database WPI, Section CH, Week 9206, Derwent Publications Ltd. London, GB, Dec. 18, 1991 See Abstract.
Database WPI, Section CH, Week 8523, Derwent Publications Ltd. London, GB, Apr. 25, 1995 See Abstract.

*Primary Examiner*—Peter D. Mulcahy
(74) *Attorney, Agent, or Firm*—Nixon & Vanderhye

(57) ABSTRACT

The disclosure described a material having a damping property, comprising 100 parts by weight of a binder resin composed of 85 to 99% by weight of at least one base resin selected from the group consisting of polypropylenes, polystyrenes, acrylonitrile-butadiene-styrene copolymers, polycarbonates, polyphenylene ethers and modified polyphenylene ethers and 1 to 15% by weight of styrene-isoprene-styrene block copolymer, and 1 to 20 parts by weight of iron compound particles.

12 Claims, No Drawings

MATERIAL HAVING A DAMPING PROPERTY AND MASTERBATCH PELLETS THEREOF

This is a division of application Ser. No. 08/855,012, filed May 13, 1997, now U.S. Pat. No. 5,977,235 which is a continuation of Ser. No. 08/496,914 filed Jun. 29, 1995, now abandoned.

BACKGROUND OF THE INVENTION

The present invention relates to a material having a damping property and masterbatch pellets used for production thereof. More particularly, the present invention relates to a material having a damping property which shows a hill internal loss at around room temperature and has a sufficient strength and hardness. The material having a damping property (hereinafter referred to as "damping material") of the present invention is mainly used as structural materials of electrical or electronic equipment, casings or bodies of household electric appliances of office automation equipments, parts of various kinds of machines and apparatus, interior parts of vehicles and ships, building materials and the like. It finds particularly useful application to a cartridge half and a cassette half.

As is well known, a damping material is widely used in many fields of industry for the purpose of damping vibration or noise generated from various sources and occasions, for example, vibration or noise which is generated incidental to operation of engine or motor mounted in various kinds of machines and apparatus, for instance, office automation equipments, household electric appliances such as washing machines, dryer, etc., a cartridge half and cassette half of data cartridge tapes, video tapes, audio tapes, etc., disk shells of optical discs, magneto-optical discs, magnetic discs, acoustic optical discs, etc., acoustic equipments, precision machine tools, works plant equipments, and various kinds of vehicles and ships; vibration or noise generated from piping such as water and gas pipes in buildings, ducts of air conditioning systems, etc.; and vibration or noise generated from running of vehicles on road or railway tracks The damping material is usually offered as a sheet-like material or block-like material produced by kneading and molding a binder resin and filler material such as mica, iron oxide or the like by a suitable molding method such as extrusion molding, calender molding, compression molding, injection molding or cast molding, or it is provided directly as a structural material of electrical or electronic equipments, casings of household electric appliances, office automation equipments, a cartridge half and a cassette half, etc. Namely, as for the using mode of the damping material, it may be used so that a molded sheet-like material or block-like material is stuck to or put between pertinent section(s) of an objective apparatus, etc., or it may be directly applied as a structural material of electrical or electronic equipments, casings of household electric appliances, office automation equipments, a cartridge half, a cassette half, etc.

Recently, there is seen a remarkable trend toward the miniaturization and lightweight of handy apparatus such as office automation equipments and acoustic equipments, and a damping material used in such machines, equipments, appliances and tools has been strongly required to miniaturize and reduce the weight. To meet this requirements, the damping materiel is demanded to have a high damping property, that is, a high internal loss. However, if it is simply tried to increase the amount of inorganic filler material used in the damping material for the only purpose of improving damping property, it invites a reduction of strength and hardness of rigid resin used as binder resin, and moldability of the material is impaired. Further, since specific gravity of the produced damping materiel elevates, this runs counter to the requirements of the miniaturization and lightweight It is thus strongly required of damping material to have an excellent damping property while maintaining an intrinsic strength (e.g. bending strength) and hardness of a rigid resin. This fact is referred to in, for instance, Japanese Patent Application Laid-open (KOKAI) No. 4-45142 which states: "As thermoplastic resin composition having damping properties, there are known compositions obtained by blending a large amount of filler material such as calcium carbonate with polypropylene. These compositions, however, had the disadvantages in that the intrinsic priorities of resin (such as good moldability and high impact strength) are deteriorated because of blending of a large amount of filler material. Development of a damping materiel capable of retaining the intrinsic properties of resin has, therefore, been desired"

Recently, large numbers of the movable parts such as motors, relays, transforms, gears, cums, gear boxes and the like, and the electrical, electronic or machine parts which generate vibration and/or noise are used in the household electric appliances or the office automation equipments. The vibration generated from such parts is transferred to other parts and/or casings, and as a result, the intended performances of the product can not be exhibited. According to circumstances, it may be invite to malfunction and/or generate unpleasant vibration. So, the damping material used as a structural material of the electrical, electronic or machine parts, and the casings of the household electric appliances or the office automation equipments is strongly required to have a sufficiently high strength and hardness, and excellent internal loss at around room temperature (e g., 20 to 28° C.).

Also, in recording media such as optical disks or magnetic disks used in computers, word processors and the like, data-cartridge tapes, video and audio optical disks, cassette tapes, etc., higher reliability, tone quality and picture quality of the recording media are strongly demanded.

These recording media are set in a recorder and driven to run by a motor or other motive force to make recording or reading-out. Vibration generated in the inside of the cartridge half or cassette half (for example, vibration caused by "play" around a shaft such as hub for taking up the magnetic tape) or vibration from a source outside the cartridge half or cassette half (for example, vibration caused by operation of motor) exerts baneful influence on recording and reading-out, so that it is difficult to have accurate recording and reading-out of information. Therefore, the damping material used as a structural material for cartridge half or cassette half is strongly required to satisfy the above requirement, i.e., to have an excellent internal loss at around room temperature while maintaining high strength and hardness.

As binder resin for damping material, there are usually used thermoplastic resins (rigid resins) such as polypropylenes, polystyrenes, acrylonitrile-butadiene-styrene copolymers, polycarbonates, polyphenylene ethers, modified polyphenylene ethers and the like. These rigid resins are preferably used because of relatively low cost and excellent molding workability.

These rigid resins, however, are not satisfactorily excellent in internal loss at around room temperature.

Many attempts have been made for improving a damping property of these rigid resins. For instance, Japanese Patent Application Laid-open (KOKAI) No. 2-3.00250 proposes a polypropylene composition improved in a damping property obtained by incorporating a styrene-isoprene-styrene block copolymer in polypropylene resin. Japanese Patent Application Laid-open (KOKAI) No. 3-45646 proposes an ABS resin composition having improved damping property, obtained by incorporating a styrene-isoprene-styrene copolymer to an acrylonitrile-butadiene-styrene copolymer. Japanese Patent Application Laid-open (KOKAI) No. 3-181552 proposes a polyphenylene ether resin composition having excellent damping properties, comprising a polyphenylene ether and a styrene-isoprene-styrene block copolymer. Japanese Patent Application Laid-open (KOKAI).No. 5-70699 proposes a thermoplastic resin composition with improved damping property, obtained by incorporating a styrene-isoprene-styrene block copolymer in a thermoplastic resin. Also, in Japanese Patent Application Laid-open (KOKAI) No. 5-592.34 is proposed a damping material resin composed of polypropylene and a styrene-isoprene-styrene block copolymer.

More specifically, Japanese KOKAI No. 2-300250 discloses a polypropylene composition comprising (a) 97–50 parts by weight of polypropylene and (b) 3–50 parts by weight of a block copolymer having a number-average molecular weight of 30,000–300,000 or a hydrogenation product thereof, the said block copolymer composed of blocks (A) comprising an aromatic vinyl monomer having a number-average molecular weight of 2,500–40,000 and blocks (B)comprising isoprene or an isoprene-butadiene mixture, whose number-average molecular weight is 10,000–200,000 and 3,4 bond and 1,2 bond content is 40% or more, and which shows a peak of main dispersion of tan δ at 0° C. or more.

The problem to be solved by Japanese KOKAI No. 2-300250 is to reduce vibration and noise at around room temperature in the range where various kinds of the equipments and appliances are practically used.

Japanese KOKAI No. 3-45646 discloses an ABS resin composition comprising (a) 97–50 parts by weight of an ABS resin and (b) 3–50 parts by weight of a block copolymer having a number-average molecular weight of 30,000–300,000 or a hydrogenation product thereof, the said block copolymer composed of blocks (A) comprising an aromatic vinyl monomer having a number-average molecular weight of 2,500–40,000 and blocks (B) comprising isoprene or an isoprene-butadiene mixture, having a number-average molecular weight of 10,000–200,000 and a 3,4 bond and 1,2 bond content of 40% or more and showing a peak of main dispersion of tan δ at 0° C. or more.

The object of Japanese KOKAI No. 3-45646 is to improve a damping property at around room temperature in the widely used ABS resin for damping material in various kinds of the equipments and appliances.

Japanese KOKAI No. 3-181552 discloses a polyphenylene ether resin composition comprising (a) 97–50 parts by weight of polyphenylene ether and (b) 3–50 parts by weight of a block copolymer having a number-average molecular weight of 30,000–300,000 or a hydrogenation product thereof, the said block copolymer composed of blocks (A) comprising an aromatic vinyl monomer having a number-average molecular weight of 2,500–40,000 and blocks (B)comprising isoprene or an isoprene-butadiene mixture, having a number-average molecular weight of 10,000–200,000 and a 3,4-bond and 1,2-bond content of 40% or more and showing a peak of main dispersion of tan δ at 0° C. or more.

Japanese KOKAI No. 5-70699 discloses a thermoplastic resin composition comprising (a) 97–50 parts by weight of a thermoplastic resin and (b) 3–50 parts by weight of a block copolymer having a number-average molecular weight of 30,000–300,000 or a hydrogenation product thereof, said block copolymer composed of blocks (A) comprising an aromatic vinyl monomer having a number-average molecular weight is 2,500–40,000 and blocks (B) comprising isoprene or an isoprene-butadiene mixture, whose number-average molecular weight is 10,000–200,000 and Tg is 0 to 40° C., wherein said blocks A and B are coupled together in the form of $A(BA)_n$ or $(AB)_n$ (n: an integer of 1 or more).

The object of Japanese KOKAI No. 5-70699 is to improve impact resistance in the low temperature region.

The thermoplastic resins proposed in Japanese KOKAI No. 5-70669 include polyolefins such as polyethylene and polypropylene, polyester such as polyethylene terephthalate and polybutylene terephthalate, styrene resins such as ABS and AS resins, polyamides, polyphenylene ethers, polyacetals and polycarbonates.

Japanese KOKAI No. 5-59234 discloses a damping material resin comprising a polypropylene resin composition composed of a mixture of 50–95% by weight of a polypropylene and 5–50% by weight of a thermoplastic elastomer and an inorganic filler, said inorganic filler being blended in an amount of 10–150 parts by weight based on 100 parts by weight of said resin mixture, wherein said thermoplastic elastomer is composed of a block polymer of a styrene-isoprene-styrene structure having polyisoprene blocks of vinyl structure A damping material composition obtained by adding iron oxide particles as an inorganic filler for improving a damping property is proposed in Japanese Patent Application Laid-open (KOKAI) No. 3-287652. The composition of this KOKAI comprises 100 parts by weight of a block copolymer having a number-average molecular weight of 30,000 to 300,000 and composed of blocks (A) comprising an aromatic vinyl monomer having a number-average molecular weight of 2,500 to 40,000, and blocks (B) comprising isoprene or an isoprene-butadiene mixture, having a number-average molecular weight of 10,000 to 200,000 and a 3,4-bond and 1,2-bond content of 40% or more and showing a peak of main dispersion of tan δ at 0° C. or more, and 30 to 1000 parts by weight of iron oxide particles.

In production of damping materials mainly composed of thermoplastic resins, it has been common practice in the art to add an inorganic filler material directly to a base resin. However, for better handling and easier preparation of the composition, there is proposed a process using masterbatch pellets in which masterbatch pellets are prepared by dispersing an inorganic filler material in a base resin at a higher concentration than the desired one and these masterbatch pellets are mixed and dispersed in the base resin to adjust the concentration of inorganic filler to the purposed level thereof.

Accordingly, the masterbatch pellets for the damping material, which are easy to handle in producing the damping material and capable of affording a satisfactory damping effect with a moderate amount of addition thereof, are also required.

A damping material having an excellent internal loss in the commonly used temperature range, particularly at around room temperature (for example, 20 to 28° C.), while maintaining a satisfactorily high strength and hardness of a rigid resin, is most strongly required at present, but none of the damping materials of the prior art mentioned above is unable to well satisfy the said requirements.

Any of the damping materials disclosed in the above-mentioned Japanese KOKAIs No. 2-300250, No. 3-45646, No. 3-181552, No. 5-70699 and No. 5-59234 is unsatisfactory in a damping property because of non-use of iron oxide particles as inorganic filler and also incapable of maintaining an intrinsic strength and hardness of a rigid resin because or high content of an inorganic filler.

The damping material disclosed in Japanese KOKAI No. 3-287652 mentioned above has an excellent damping property in the practical temperature range from room temperature to high temperature but is low in strength, that is, this damping material is low in bending modulus.

The problem to be solved by the present invention is to provide a damping material having an excellent internal loss in the practical temperature range, particularly at around room temperature, while maintaining the intrinsic strength and hardness of rigid resin.

As a result of the present inventors' earnest studies for solving the above-mentioned problem, it has been found that by preparing masterbatch pellets from 100 parts by weight of a binder resin composed of not more than 70% by weight of at least one base resin selected from the group consisting of polypropylenes, polystyrenes, acrylonitrile-butadiene-styrene copolymers, polycarbonates, polyphenylene ethers and modified polyphenylene ethers, and not less than 30% of styrene-isoprene-styrene block copolymer, and 50 to 300 parts by weight of iron compound particles, adding .70 to 99% by weight of at least one base resin selected from polypropylenes, polystyrenes, acrylonitrile-butadiene-styrene copolymers, polycarbonates, polyphenylene ethers and modified polyphenylene ethers to 1 to 30% by weight of said masterbatch pellets, and after kneading, molding the resultant mixture, the obtained damping material composed of 100 parts by weight of a binder resin composed of 85 to 99% by weight of at least one base resin selected from polypropylenes, polystyrenes, acrylonitrile-butadiene-styrene copolymer, polycarbonates, polyphenylene ethers and modified polyphenylene ethers and 1 to 15% by weight of styrene-isoprene-styrene block copolymers, and 1 to 20 parts by weight of iron compound particles, has an excellent internal loss at around room temperature, and high strength and hardness. The present invention has been attained on the basis of this finding.

SUMMARY OF THE INVENTION

The object of the present invention is to provide a damping material having an excellent internal loss at around room temperature, and satisfactory strength and hardness.

To attain the aim, in the first aspect of the present invention, there is provided a damping material comprising 100 parts by weight of binder resin composed of 85 to 99% by weight of at least one base resin selected from polypropylenes, polystyrenes, acrylonitrile-butadiene-styrene copolymers, polycarbonates, polyphenylene ethers and modified polyphenylene ethers and 1 to 15% by weight of styrene-isoprene-styrene block copolymer, and 1 to 20 parts by weight of iron compound particles.

DETAILED DESCRIPTION OF THE INVENTION

The damping material according to the present invention has a loss factor of not less than 0.015, preferably not less than 0.020 at a temperature of 24° C. and a relative bending modulus of not less than 70%, preferably not less than 75% based on a bending modulus of a damping material consisting of the base resin, which show that the internal loss at around room temperature is excellent and the intrinsic strength and hardness of rigid resin is fully maintained As base resin used in the present invention, one or more of the resins selected from the group consisting of polypropylenes, polystyrenes, acrylonitrile-butadiene-styrene copolymers, polycarbonates, polyphenylene ethers and modified polyphenylene ethers can be used. The amount of the base resin used is 85 to 99% by weight, preferably 88 to 98% by weight based on the binder resin. When the amount of the base resin exceeds 99% by weight, there can not be obtained the desired effect of improving the damping property because of too small content of styrene-isoprene-styrene block copolymer in the binder resin. When the amount of the base resin is less than 85% by weight, the strength and hardness of the base resin, specifically the bending modulus thereof is lowered because of too large content of styrene-isoprene-styrene block copolymer in the binder resin, and thus it is impossible to maintain the intrinsic strength of the base resin and to provide the damping material of the desired bending modulus and hardness.

As polypropylenes usable in the present invention, homopolypropylenes, propylene copolymers such as propylene-ethylene random copolymer (ethylene content being not more than 20% by weight) and propylene-ethylene block copolymer (ethylene content being not more than 20 by weight), and polypropylenes modified with an unsaturated carboxylic acid or derivatives thereof may be exemplified.

Acrylonitrile-butadiene-styrene copolymers used in the present invention are of a composition of 20 to 30 wt % of acrylonitrile, 10 to 30 wt % of butadiene and 40 to 70 wt % of styrene.

As polystyrenes used in the present invention, available polystyrenes including homopolystyrenes and copolymers such as polystyrene-butadiene copolymers, etc. can be cited. As the polystyrene-butadiene copolymers, a high-impact polystyrene (HI-PS) obtained by graft-polymerizing styrene to butadiene rubber may be exemplified.

Polycarbonates used in the present invention are preferably one having a viscosity-average molecular weight of $1.8 \times 10^4$ to $3.3 \times 10^4$. Such polycarbonates are commercially available under the trade names of Novalex (produced by Mitsubishi Chemical Co., Ltd.), Panlight (produced by Teiji Chemical Co., Ltd.), Yupiron (Produced by Mitsubishi Gas Chemical Co., Ltd.), Taflon (produced by Idemitsu Petrochemical Co., Ltd.), Rexan (produced by General Electric Corp.), Macron (Produced by Bayer Corp.), etc.

Examples of polyphenylene ethers usable in the present invention are poly(2,6-dimethyl-1,4-phenylene) ether, poly (2,6-diethyl-1,4-phenylene) ether, poly(2-methyl-6-ethyl-1, 4-phenylene) ether, poly(2-methyl-6-propyl-1,4-phenylene) ether, poly(2,6-dipropyl-1,4-phenylene) ether, and poly(2-ethyl-6-propyl-1,4-phenylene) ether.

Modified polyphenylene ethers usable in the present invention is a polymer alloy of polyphenylene ether and styrene-based resin (Noryl resin, produced by General Electric Corp.) and a polymer alloy of polyphenylene ether and polyamide resin (Noryl GTYX resin, produced by General Electric Corp.).

As a base resin, polystyrenes, acrylonitrile-butadiene-styrene copolymers, polycarbonates, polyphenylene ethers and modified polyphenylene ethers are preferably used in the present invention.

Styrene blocks in the styrene-isoprene-styrene block copolymer used in the present invention are constituted by an aromatic vinyl monomer capable of anionic polymerization, such as styrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, 4-phenylbutylstyrene and the like. Among them, styrene is especially preferred.

Isoprene blocks in the said styrene-isoprene-styrene block copolymer are preferably constituted by isoprene or isoprene-butadiene. In case other monomers are used, for instance, if butadiene alone is used, the temperature at which a damping effect is produced is below 0° C. even if the content of vinyl bonds is increased, and the desired damping property cannot be obtained in the practical temperature range. In this case, therefore, the damping material can be applied to a wide scope of use and has a very high practical significance. When isoprene-butadiene is used, the desired damping property can be obtained in the temperature range not less than 0° C. in case of isoprene being not less than 40%. As the isoprene-butadiene copolymers, random, block or tapered copolymers are usable.

Number-average molecular weight of the obtained styrene-isoprene-styrene block copolymer is in the range of 30,000 to 300,000. When the molecular weight is less than 30,000, the mechanical properties such as strength and elongation at breaking of the block copolymer itself are deteriorated, resulting in a reduced strength of the damping material. When the molecular weight exceeds 300,000, the workability thereof worsened. Thus, the preferred range of the molecular weight (Mn) of the said block copolymers is from 80,000 to 250,000.

The block formation in the said styrene-isoprene-styrene block copolymers is $A(BA)_n$ or $(AB)_n$, wherein A represents styrene block, B represents isoprene block, and n is an integer of 1 or more. The formation of $A(BA)_n$ is preferred.

The content of the styrene-isoprene-styrene block copolymers in the binder resin is in the range of 1 to 15% by weight, preferably 2 to 12% by weight. When the content is less than 1% by weight, the desired improvement of damping properties can not be obtained due to diffusion of the said block copolymers in the base resin. When the content exceeds 15% by weight, the strength and hardness of the base resin is lowered, thereby making it unable to maintain the intrinsic strength and hardness of the base resin.

As iron compound particles in the present invention, there can be used hematite particles, maghemite particles, magnetite particles, Berthollide compounds particles and hard ferrite particles such as strontium ferrite particles and barium ferrite particles, and hydrous iron oxide particles such as goethite ($\alpha$-FeOOH) particles, akaganeite ($\beta$-FeOOH) particles, lepidocrosite ($\gamma$-FeOOH) particles and the like. Among them, magnetite particles, strontium ferrite particles and barium ferrite particles are preferred. The preferred BET specific surface of the magnetite particles is 3 to 40 $m^2/g$ and the BET specific surface the barium ferrite particles or strontium ferrite particles is 0.3 to 20 $m^2/g$. The shape thereof is not limited, and it may be, for instance, granular, spindle, acicular, plate-like or the like. The granular shape is preferred. The average particle size of the iron compound particles usable in the present invention is in the range of 0.05 to 10 $\mu m$. It is preferable in the range of 0.1 to 5 $\mu m$ due to advantageous in terms of properties of the damping material and economy.

The amount of iron compound particles used in the present invention is 1 to 20 parts by weight based on 100 parts by weight of the binder resin. When the amount is less than 1 part by weight, the desired excellent internal loss can not be obtained When the amount exceeds 20 parts by weight, the bending modulus which is an index of strength of rigid resin, lowers to make it unable to obtain a satisfactory strength of the damping material. Also, specific gravity of the damping material increases, thereby vitiating the advantage of the resin of being lightweight The preferred content of iron compound particles is 3 to 20 parts by weight based on 100 parts by weight of the binder resin.

The damping material according to the present invention comprises the base resin, the styrene-isoprene-styrene block copolymer and the iron compound particles as essential components, but if necessary, other polymer(s), compatibilizing agent, oxidation stabilizer, etc., may be blended within the range which does not impair the purpose of the present invention. For instance, polymers such as natural rubbers (NR), isoprene rubbers (IR), butadiene rubbers (BR), styrene-butadiene rubbers (SBR), ethylene-propylene-diene terpolymers (EPDM), ethylene-propylene rubbers (EPR), styrene-conjugated diene block copolymers and hydrogenation product thereof may be blended. The amount of the polymer is not more than 30 parts by weight, preferably in the range of 5 to 25 parts by weight based on 100 parts by weight of the binder,resin.

For producing the damping material according to the present invention, masterbatch pellets for damping material described later and the base resin composed of at least one resin selected from the group consisting of polypropylenes, polystyrenes, acrylonitrile-butadiene-styrene copolymers, polycarbonates, polyphenylene ethers and modified polyphenylene ethers are mixed by a suitable mixer such as Ribbon blender, Nauta mixer, Henschel mixer or Supermixer, and the resultant mixture is molded into the objective product by a suitable molding machine such as injection molding machine.

The masterbatch pellets for the damping material according to the present invention have a grain size of 1 to 10 mm, preferably 3 to 7 mm. When the grain size of pellets is less than 1 mm, the workability is bad in the production of pellets, while when the grain size exceeds 10 mm, it becomes difficult to disperse the pellets in base resin.

The grain shape is not specified, but it may be, for instance, indeterminate, columnar, spherical, flaky and the like.

As the base resin of the said masterbatch pellets, at least one resin selected from the group consisting of polypropylenes, polystyrenes, acrylonitrile-butadiene-styrene copolymers, polycarbonates, polyphenylene ethers and modified polyphenylene ethers is used in an amount of not more than 70% by weight, preferably in the range of not more than 65% by weight based on the binder resin. When the amount of the base resin exceeds 70% by weight, it is difficult to obtain the desired concentration of styrene-isoprene-styrene block copolymer resin in production of damping material because of small content of styrene-isoprene-styrene block copolymer.

The composition of base resin in the masterbatch pellets may be the same combination of resins as base resin to be mixed with masterbatch pellets, or may be a different combination of the resins.

As styrene-isoprene-styrene block copolymer resin in the masterbatch pellets, there can be used the resins mentioned above and the amount thereof added is 30 to 100% by weights preferably 35 to 100% by weight based on the binder resin of the masterbatch pellets. If the amount of this resin is less than 30% by weight, it is undesirable since the amount of masterbatch pellets necessary for producing the damping material increases.

As iron compound particles of the masterbatch pellets, those mentioned above can be used and the amount of the iron compound particles is 50 to 300 parts by weight, preferably 60 to 250 parts by weight based on 100 parts by weight of the binder resin. If the amount of the iron compound particles is less than 50 parts by weight, the amount of the masterbatch pellets necessary for producing the damping material increases. If the amount of the iron compound particles exceeds 300 parts by weight, it becomes difficult to adjust the content of the iron compound particles to a desired level since their content in the damping material is varied greatly by a slight change of the amount of the masterbatch pellets added. This is also causative of extensive mechanical abrasion.

The masterbatch pellets for the damping material according to the present invention are produced by mixing styrene-isoprene-styrene block copolymers and iron compound particles with base resin selected from polypropylenes, polystyrenes, acrylonitrile-butadiene-styrene copolymer, polycarbonates, polyphenylene ethers and modified polyphenylene ethers by a suitable mixing machine such as Ribbon blender, Nauta mixer, Henschel mixer, Supermixer or the like, and kneading and molding the resultant mixture by a known single-screw or twin-screw extruder, and cutting the molded product, or pulverizing and molding the resultant mixture kneaded by a Banbury mixer, press kneader or the like and cutting the molded product, thereby obtaining the desired granular material.

The damping material according to the present invention is produced by adding 1 to 30% by weight of the said masterbatch pellets to 70 to 99% by weight, preferably 75 to 95% by weight of the base resin comprising at least one resin selected from the group consisting of polypropylenes, polystyrenes, acrylonitrile-butadiene-styrene copolymers, polycarbonates, polyphenylene ethers and modified polyphenylene ethers, and kneading and molding the resultant mixture. The preferable amount of the masterbatch pellets added 5 to 25% by weight/ more preferably 5 to 20% by weight. When the amount of the masterbatch pellets added is less than 1% by weight, the effect of addition thereof is too small When the amount of the masterbatch pellets exceeds of 30% by weight, the intrinsic strength and hardness of base resin may be adversely affected.

The structural materials of electrical or electronic equipments, casings or bodies of household electric appliances, office automation equipments, etc., a cartridge half, a cassette half and the like according to the present invention are produced from the damping material of the present invention, and the above-described production process can be employed for the production of the structural materials of electrical or electronic equipments, casings or bodies of household electric appliances, office automation equipments, etc., a cartridge half, a cassette half and the like.

The structural materials of electrical or electronic equipments, casings or bodies of household electric appliances, office automation equipments, etc., a cartridge half, a cassette half and the like according to the present invention have a loss factor of not less than 0.015, preferably not less than 0.020 at an ordinary temperature (24° C.), and a relative bending modulus of not less than 70%, preferably not less than 75% based on a bending modulus of structural materials, casings, a cartridge half, a cassette half made of only the base resin.

The fact that a damping material having an excellent internal loss in the practical temperature range, especially at around room temperature, while maintaining the intrinsic strength and hardness of rigid resin can be obtained according to the present invention may be accounted for by the followings.

It is considered that in the damping material according to the present invention, styrene-isoprene-styrene block copolymer is dispersed, in the form of fine lumps, in the base resin comprising at least one resin selected from the group consisting of polypropylenes, polystyrenes, acrylonitrile-butadiene-styrene copolymers, polycarbonates, polyphenylene ethers and modified polyphenylene ethers, and a damping effect is produced by friction at the interface between the dispersed fine lumps of styrene-isoprene-styrene block copolymer and the base resin; The fact is particularly notable that the smaller the size of the said dispersed fine lumps, the greater becomes the contact area between the dispersed fine lumps of styrene-isoprene-styrene block copolymer and the base resin, resulting in a better damping property, that is, higher internal loss.

However, when the content of styrene-isoprene-styrene copolymer is increased, although the loss factor elevates, the intrinsic strength and hardness of the rigid resin, specifically its bending modulus, is reduced.

As a result of the present inventors studies on the subject problem, it has been found that by using iron compound particles, it is possible to elevate the loss factor more than that of using conventional inorganic fillers such as mica other than iron compound, and by adding a small amount of styrene-isoprene-styrene block copolymer resin, the efficient enhancement of loss factor can be effected, while suppressing the lowering the strength and hardness of the base resin.

This effect may be attributed to the followings. The lumps of styrene-isoprene-styrene block copolymer dispersed in base resin can be made fine in size due to the iron compound particles, and consequently the dispersed state of the lumps thereof becomes finer, thereby elevating the damping effect by friction with the base resin, resulting in an increased loss factor.

By the way, as seen from Comparative Examples 13 and 14 described later, the damping property of the damping material comprising the base resin and iron compound particles dispersed in the base resin without blending styrene-isoprene-styrene block copolymer do not improved.

Further, a smaller amount of the iron compound particles than that of mica or other conventional filler is required for obtaining a same level of loss factor, and the amount of styrene-isoprene-styrene block copolymer to be added can be minimized. As a result, it is considered that a damping material showing an excellent internal loss in the practical temperature range, particularly at around room temperature, while maintaining the intrinsic strength and hardness of the rigid resin, can be obtained.

Thus, according to the present invention, by the synergistic effect of the combination and the said specific mixing ratios of (1) base resin comprising at least one resin selected from the group consisting of polypropylenes, polystyrenes, acrylonitrile-butadiene-styrene copolymers, polycarbonates, polyphenylene ethers and modified polyphenylene ethers, preferably at least one resin selected from the group consisting of polystyrenes, acrylonitrile-butadiene-styrene copolymers, polycarbonates, polyphenylene ethers and modified polyphenylene ethers (2) styrene-isoprene-styrene block copolymer, and (3) iron compound particles, such damping material has a loss factor of not less than 0.015, preferably not less than 0.020 at an ordinary temperature (24° C.), a relative bending modulus of not less than 70%, preferably not less than 75% based on a bending modulus of a damping material consisting of the base resin, and a specific gravity of 0.95 to 1.30.

The damping material according to the present invention, as described particularly in the Examples given below, has a high internal loss at around room temperature, while maintaining the intrinsic strength and hardness of rigid resin, so that it is capable of significant miniaturization, lightweight and thinning, and can be effectively applied to structural materials of electrical or electronic equipments, casings or bodies of office automation equipments or household electric appliances, parts of various kinds of machines and apparatus, internal parts of vehicles and ships, building materials, etc., particularly useful to cartridge half and cassette half of data cartridge tapes, video tapes, audio tapes etc., disk shell of optical discs, magneto-optical discs, magnetic discs, acoustic optical disc, etc.

EXAMPLE

The present invention will be explained in more detail hereinafter with reference to the following examples and comparative examples.

Loss factor η used as an index of damping property, i.e., loss factor of the damping material was determined by injection molding a 200 mm×12.5 mm×3 mm test piece and measuring loss factor η of this test piece by cantilever beam-type resonance method under the conditions of 24° C. and 1 kHz.

Loss factor η of casing of cassette half, household electric appliances or office automation equipments was determined in the followings. The casing was suspended from two points with a kite string. Then a metal ball (1.05 g in weight and 6 mm in diameter) suspended with a kite string (250 mm in length) was pulled up to an angle of 60° from the vertical plane with its fulcrum taken vertically above the casing and dropped down to the casing to give vibrations to the central part of the casing. Transmission of vibrations was detected by a vibration pickup set at the bottom of the casing and data processing was made by FFT Analyzer 3550 (manufactured by B & K Corp.) under the condition of 24° C. to determine loss factor η.

Bending modulus which is an index of strength of damping material was determined by injection molding a 80 mm×12.5 mm ×3 mm test piece and measuring bending modulus of this test piece according to ASTM D-790.

Specific gravity was measured by a specific gravity hydrometer manufactured by EW-120SG, Mirage Trading Co., Ltd.).

Production of Masterbatch Pellets for Damping Material

Example 1

100 parts by weight of binder resin composed of 50 parts by weight of high-impact polystyrene resin (Sumibright M-574, produced by Sumitomo Chemical Co., Ltd.) and 50 parts by weight of styrene-isoprene-styrene block copolymer (VS-1, produced by Kuraray Co., Ltd.), and 100 parts by weight of granular magnetite (VD-803C, produced by Toda Kogyo Corporation; average particle size: 0.27 μm and BET specific surface area: 4.5 m²/g) were kneaded at 160° C. by a twin-screw kneader and extruded from a 3 mmØ die, and the extrudate was cut to the approximately 3 mm units to obtain masterbatch pellets A.

Examples 2–9 and Comparative Examples 1–2

The kind and amount of base resin, styrene-isoprene-styrene block copolymer and iron oxide particles in the masterbatch pellets were selected as shown in Table 1 to prepare masterbatch pellets for damping material B-K.

Production of Damping Material

Example 10

90 parts of high-impact polystyrene resin (Sumibright M-574, produced by Sumitomo Chemical Co, Ltd) used as base resin and 10 parts by weight of masterbatch pellets A were uniformly blended by a Henschel mixer and injection-molded into a strip-shaped test piece. The loss factor η of this test piece at an ordinary temperature (24° C.) was 0.021., its bending modulus was 25,400 kgf/cm² (relative bending modulus: 95%) and its specific gravity was 1.09.

Examples 11–23 and Comparative Examples 3–9

Samples of damping material were produced by the same procedure as Example 10 except that kind of masterbatch pellets, the kind of base resin mixed with masterbatch pellets and the mixing ratios of said base resin and masterbatch pellets were changed as shown in Table 2. The characteristics of the samples of Examples 11–23 are shown in Table 4, and the characteristics of the samples of Comparative Examples 3–9 are shown in Table 5.

Comparative Examples 10–14

Samples of damping material were produced by blending and kneading base resin, styrene-isoprene-styrene block copolymer and flaky mica without using masterbatch pellets, at the ratios shown in Table 3, and molding the mixtures. The characteristics of these samples are shown in Table 5.

Example 24

90 parts by weight of high-impact polystyrene resin (Sumibright M-574, produced by Sumitomo Chemical Co., Ltd) used as base resin and 10 parts by weight of masterbatch pellets A were uniformly blended by a Henschel mixer and injection molded into a cassette half casing (structural materials). The loss factor η of this casing at an ordinary temperature (24° C.) was 0.031.

Reference Example 1

Cassette half of a commercial available cassette tape was taken as reference example and its loss factor at an ordinary temperature (24° C.) was determined. It was 0.015.

Example 25

93 parts by weight of polycarbonate (Novalex 7025A, produced by Mitsubishi Chemical Corporation) used as base resin and 7 parts by weight of masterbatch pellets F were uniformly blended by a Henschel mixer and injection molded into a gear. The loss factor η of this gear at ordinary temperature (24° C.) was 0.021.

Reference Example 2

A gear was produced by the same procedure as Example 25 except for not using masterbatch pellets. The loss factor η of this gear at an ordinary temperature (24° C.) was 0.008.

Example 26

90 parts by weight of modified polyphenylene ellier resin (Noryl 731, Japan G.E Plastic Co., Ltd) used as base resin and 10 parts by weight of masterbatch pellets G were uniformly blended by a Henschel mixer and injection molded into a dot printer casing (exterior part). The loss factor η of this casing at an ordinary temperature (24° C.) was 0.035.

Reference Example 3

A dot printer casing was produced by following the procedure of Example 26 without using masterbatch pellets. The loss factor 7 of this casing at an ordinary temperature (24° C.) was 0.010

TABLE 1

Production of masterbatch pellets for vibration damper
Binder resin (100 parts by weight)
Base resin

| | ABS resin | Content (% by weight) | HIPS resin |
|---|---|---|---|
| Ex. 1 | — | — | Sumibright M574 (Sumitomo Chem.) |
| Ex. 2 | — | — | — |
| Ex. 3 | ABS 15 (JSR*1)) | 40 | — |
| Ex. 4 | ABS 15 (JSR*1)) | 40 | — |
| Ex. 5 | — | — | — |
| Ex. 6 | — | — | — |
| Ex. 7 | — | — | — |
| Ex. 8 | — | — | — |
| Ex. 9 | — | — | — |
| Comp. Ex. 1 | — | — | Sumibright M574 (Sumitomo Chem.) |
| Comp. Ex. 2 | ABS 15 | 40 | — |

Production of masterbatch pellets for vibration damper
Binder resin (100 parts by weight)
Base resin

| | Content (% by weight) | PC resin | Content (% by weight) |
|---|---|---|---|
| Ex. 1 | 50 | — | — |
| Ex. 2 | — | — | — |
| Ex. 3 | — | — | — |
| Ex. 4 | — | — | — |
| Ex. 5 | — | Novalex 7025A (*2) | 50 |
| Ex. 6 | — | Novalex 7025A | 50 |
| Ex. 7 | — | — | — |
| Ex. 8 | — | — | — |
| Ex. 9 | — | — | — |
| Comp. Ex. 1 | 100 | — | — |
| Comp. Ex. 2 | — | — | — |

Production of masterbatch pellets for vibration damper
Binder resin (100 parts by weight)

| | Base resin | | | | SIS resin | |
|---|---|---|---|---|---|---|
| | PPE resin | Content (% by weight) | PP resin | Content (% by weight) | Kind | Content (% by weight) |
| Ex. 1 | — | — | — | — | VS-1 (Kuraray) | 50 |
| Ex. 2 | — | — | — | — | VS-1 (Kuraray) | 100 |
| Ex. 3 | — | — | — | — | VS-1 (Kuraray) | 60 |
| Ex. 4 | — | — | — | — | VS-1 (Kuraray) | 60 |
| Ex. 5 | — | — | — | — | VS-1 (Kuraray) | 50 |
| Ex. 6 | — | — | — | — | VS-1 (Kuraray) | 50 |
| Ex. 7 | Noryl 731 (*3) | 50 | — | — | VS-1 (Kuraray) | 50 |
| Ex. 8 | Noryl 731 | 50 | — | — | VS-1 (Kuraray) | 50 |
| Ex. 9 | — | — | K6014 (Chisso) | 50 | VS-1 (Kuraray) | 50 |
| Comp. Ex. 1 | — | — | — | — | — | — |
| Comp. Ex. 2 | — | — | — | — | VS-1 (Kuraray) | 60 |

Production of masterbatch pellets for vibration damper
Inorganic filler
Iron compound particles

| | Kind | Content (wt parts) | Pellets No. |
|---|---|---|---|
| Ex. 1 | Granular magnetite (average particle size: 0.27 μm) | 100 | A |
| Ex. 2 | Strontium ferrite plates (average plate diamter: 1.2 μm) | 233 | B |
| Ex. 3 | Strontium ferrite plates (average platge diameter: 1.2 μm) | 60 | C |
| Ex. 4 | Magnetite granular (average particle diameter: 0.27 μm) | 100 | D |
| Ex. 5 | Magnetite granular (average particle diameter: 0.27 μm) | 100 | E |
| Ex. 6 | Magnetite granular (average particle diameter: 0.27 μm) | 233 | F |
| Ex. 7 | Magnetite plates (average particle diameter: 0.27 μm) | 100 | G |
| Ex. 8 | Magnetite granular (average particle diameter: 0.27 μm) | 233 | H |
| Ex. 9 | Granular magnetite (average particle diameter: 0.27 μm) | 100 | I |
| Comp. Ex. 1 | Magnetite granular (average particle diameter: 0.27 μm) | 100 | J |
| Comp. Ex. 2 | Magnetite granular particle diameter: 0.27 μm) | 400 | K |

*1) Produced by Japan Synthetic Rubber Co., Ltd.
*2) Produced by Mitsubishi Chemical Co., Ltd.
*3) Produced by Japan G.E. Plastics Co., Ltd.

TABLE 2

Formulations for producing vibration damper

| | Masterbatch pellets | | Base resin | |
|---|---|---|---|---|
| | Kind | Content (parts by weight) | Kind | Content (part by weight) |
| Ex. 10 | A | 10 | HIPS resin (Sumibright M574) | 90 |
| Ex. 11 | A | 20 | HIPS resin (Sumibright M574) | 80 |
| Ex. 12 | A | 10 | ABS resin (ABS 15) | 90 |
| Ex. 13 | B | 10 | ABS resin (ABS 15) | 90 |
| Ex. 14 | C | 25 | ABS resin (ABS 15) | 75 |
| Ex. 15 | D | 7 | ABS resin (ABS 15) | 93 |
| Ex. 16 | D | 10 | ABS resin (ABS 15) | 90 |
| Ex. 17 | E | 12.5 | PC resin (Novalex 7025A) | 87.5 |

TABLE 2-continued

Formulations for producing vibration damper

| | Masterbatch pellets | | Base resin | |
|---|---|---|---|---|
| | Kind | Content (parts by weight) | Kind | Content (part by weight) |
| Ex. 18 | F | 7 | PC resin (Novalex 7025A) | 93 |
| Ex. 19 | F | 12.5 | PC resin (Novalex 7025A) | 87.5 |
| Ex. 20 | G | 10 | PPE resin (Noryl 731) | 90 |
| Ex. 21 | H | 7 | PPE resin (Noryl 731) | 93 |
| Ex. 22 | H | 10 | PPE resin (Noryl 731) | 90 |
| Ex. 23 | I | 10 | PP resin (K 6014) | 90 |
| Comp. Ex. 3 | — | — | HIPS resin (Sumibright M574) | 100 |
| Comp. Ex. 4 | — | — | ABS resin (ABS 15) | 100 |
| Comp. Ex. 5 | — | — | PC resin (Novalex 7025A) | 100 |
| Comp. Ex. 6 | — | — | PPE resin (Noryl 731) | 100 |
| Comp. Ex. 7 | — | — | PP resin (K 6014) | 100 |
| Comp. Ex. 8 | J | 10 | ABS resin (ABS 15) | 90 |
| Comp. Ex. 9 | K | 35 | ABS resin (ABS 15) | 65 |

TABLE 3

Formulations for producing vibration damper by direct kneading
Binder resin (100 parts by weight)

| | HIPS resin | | PC resin | |
|---|---|---|---|---|
| | Kind | Content (wt %) | Kind | Content (wt %) |
| Comp. Ex. 10 | Sumibright M574 (Sumitomo Chem.) | 97.4 | — | — |
| Comp. Ex. 11 | Sumibright M574 (Sumitomo Chem.) | 98.7 | — | — |
| Comp. Ex. 12 | Sumibright M574 (Sumitomo Chem.) | 98.7 | — | — |
| Comp. Ex. 13 | Sumibright M574 (Sumitomo Chem.) | 100 | — | — |
| Comp. Ex. 14 | — | — | PC resin (Novalex 7025A) | 100 |

Formulations for producing vibration damper by direct kneading
Binder resin (100 parts by weight)

| | PPE resin | | SIS resin | |
|---|---|---|---|---|
| | Kind | Content (wt %) | Kind | Content (wt %) |
| Comp. Ex. 10 | — | — | VS-1 (Kuraray) | 2.6 |
| Comp. Ex. 11 | — | — | VS-1 (Kuraray) | 1.3 |
| Comp. Ex. 12 | — | — | VS-1 (Kuraray) | 1.3 |
| Comp. Ex. 13 | — | — | — | — |
| Comp. Ex. 14 | — | — | — | — |

Formulations for producing vibration damper by direct kneading
Inorganic filler

| | Iron compound | | Mica | |
|---|---|---|---|---|
| | Kind | Content (wt parts) | Kind | Content (wt parts) |
| Comp. Ex. 10 | — | — | — | — |
| Comp. Ex. 11 | — | — | Flaky mica (plate diameter: 150 μm) | 5.3 |
| Comp. Ex. 12 | — | — | Flaky mica (plate diameter: 150 μm) | 11.1 |
| Comp. Ex. 13 | Granular magnetite (average particle diameter: 0.27 μm) | 4.0 | — | — |
| Comp. Ex. 14 | Strontium ferrite plates (average particle diameter: 1.2 μm) | 11.1 | — | — |

TABLE 4

Formulations for producing vibration damper by direct kneading
Binder resin (100 parts by weight)

| | HIPS resin | | ABS resin | |
|---|---|---|---|---|
| | Kind | Content (wt %) | Kind | Content (wt %) |
| Ex. 10 | Sumibright M574 (Sumitom Chem.) | 97.4 | — | — |
| Ex. 11 | Sumibright M574 (Sumitomo Chem.) | 94.4 | — | — |
| Ex. 12 | Sumibright M574 (Sumitom Chem.) | 2.6 | ABS 15 (JSR*2)) | 94.8 |
| Ex. 13 | — | — | ABS 15 (JSR) | 96.8 |
| Ex. 14 | — | — | ABS 15 (JSR) | 89.7 |
| Ex. 15 | — | — | ABS 15 (JSR) | 97.8 |
| Ex. 16 | — | — | ABS 15 (JSR) | 96.8 |
| Ex. 17 | — | — | — | — |
| Ex. 18 | — | — | — | — |
| Ex. 19 | — | — | — | — |
| Ex. 20 | — | — | — | — |
| Ex. 21 | — | — | — | — |
| Ex. 22 | — | — | — | — |
| Ex. 23 | — | — | — | — |

TABLE 4-continued

Composition of vibration damper
Binder resin (100 parts by weight)

| | PC resin | | PPE resin | | PP resin | |
|---|---|---|---|---|---|---|
| | Kind | Content (wt %) | Kind | Content (wt %) | Kind | Content (wt %) |
| Ex. 10 | — | — | — | — | — | — |
| Ex. 11 | — | — | — | — | — | — |
| Ex. 12 | — | — | — | — | — | — |
| Ex. 13 | — | — | — | — | — | — |
| Ex. 14 | — | — | — | — | — | — |
| Ex. 15 | — | — | — | — | — | — |
| Ex. 16 | — | — | — | — | — | — |
| Ex. 17 | Novalex 7025A | 96.7 | — | — | — | — |
| Ex. 18 | Novalex 7025A | 98.9 | — | — | — | — |
| Ex. 19 | Novalex 7025A | 97.9 | — | — | — | — |
| Ex. 20 | — | — | Noryl 731 *4) | 97.4 | — | — |
| Ex. 21 | — | — | Noryl 731 | 98.9 | — | — |
| Ex. 22 | — | — | Noryl 731 | 98.4 | — | — |
| Ex. 23 | — | — | — | — | K-6014 (Chisso) | 97.4 |

Composition of vibration damper

| | parts by weight) SIS resin | | Inorganic filler Iron compound particles | |
|---|---|---|---|---|
| | Kind | Content (wt %) | Kind | Content (wt %) |
| Ex. 10 | VS-1 (Kuraray) | 2.6 | Granular magnetite (particle diameter: 0.27 μm) | 5.3 |
| Ex. 11 | VS-1 (Kuraray) | 5.6 | Granular magnetite (particle diameter: 0.27 μm) | 11.1 |
| Ex. 12 | VS-1 (Kuraray) | 2.6 | Granular magnetite (particle diameter: 0.27 μm) | 5.3 |
| Ex. 13 | VS-1 (Kuraray) | 3.2 | Strontium ferrite plates (plate diameter: 1.2 μm) | 7.5 |
| Ex. 14 | VS-1 (Kuraray) | 10.3 | Strontium ferrite plates (plate diameter: 1.2 μm) | 10.3 |
| Ex. 15 | VS-1 (Kuraray) | 2.2 | Granular magnetite (particle diameter: 0.27 μm) | 3.6 |
| Ex. 16 | VS-1 (Kuraray) | 3.2 | Granular magnetite (particle diameter: 0.27 μm) | 5.3 |
| Ex. 17 | VS-1 (Kuraray) | 3.3 | Granular magnetite (particle diameter: 0.27 μm) | 6.5 |
| Ex. 18 | VS-1 (Kuraray) | 1.1 | Granular magnetite (particle diameter: 0.27 μm) | 5.2 |
| Ex. 19 | VS-1 (Kuraray) | 2.1 | Granular magnetite (particle diameter: 0.27 μm) | 9.6 |
| Ex. 20 | VS-1 (Kuraray) | 2.6 | Granular magnetite (particle diameter: 0.27 μm) | 5.3 |
| Ex. 21 | VS-1 (Kuraray) | 1.1 | Granular magnetite (particle diameter: 0.27 μm) | 5.2 |
| Ex. 22 | VS-1 (Kuraray) | 1.6 | Granular magnetite (particle diameter: 0.27 μm) | 7.5 |
| Ex. 23 | VS-1 (Kuraray) | 2.6 | Granular magnetite (particle diameter: 0.27 μm) | 5.3 |

TABLE 4-continued

| | Composition of vibration damper | | Properties of vibration damper | | | |
|---|---|---|---|---|---|---|
| | Inorganic filler Mica | | | Bending modulus of elasticity | | |
| | Kind | Content (part by weight) | Loss factor *1) | Measured values (kgf/cd) | Relative values (%) | Specific gravity |
| Ex. 10 | — | — | 0.021 | 25400 | 95 | 1.09 |
| Ex. 11 | — | — | 0.039 | 23500 | 88 | 1.13 |
| Ex. 12 | — | — | 0.028 | 23700 | 95 | 1.09 |
| Ex. 13 | — | — | 0.027 | 22800 | 91 | 1.11 |
| Ex. 14 | — | — | 0.059 | 19500 | 78 | 1.12 |
| Ex. 15 | — | — | 0.020 | 24200 | 97 | 1.07 |
| Ex. 16 | — | — | 0.031 | 23800 | 95 | 1.09 |
| Ex. 17 | — | — | 0.024 | 20600 | 94 | 1.23 |
| Ex. 18 | — | — | 0.021 | 21100 | 97 | 1.23 |
| Ex. 19 | — | — | 0.025 | 20200 | 93 | 1.27 |
| Ex. 20 | — | — | 0.023 | 23800 | 95 | 1.10 |
| Ex. 21 | — | — | 0.020 | 24500 | 98 | 1.10 |
| Ex. 22 | — | — | 0.028 | 23200 | 93 | 1.14 |
| Ex. 23 | — | — | 0.026 | 11600 | 93 | 0.96 |

*1) Measuring conditions: 24° C., 1 kHz
*2) JSR: Produced by Japan Synthetic Rubber Co., Ltd.
*3) Produced by Mitsubishi Chemical Co., Ltd.
*4) Produced by Japan G.E. Plastic Co., Ltd.

TABLE 5

Compositions of vibration damper
Binder resin (100 parts by weight)

| | HIPS resin | | ABS resin | |
|---|---|---|---|---|
| | Kind | Content (% by weight) | Kind | Content (% by weight) |
| Comp. Ex. 3 | Sumibright M574 (Sumitom Chem.) | 100 | — | — |
| Comp. Ex. 4 | — | — | ABS 15 (JSR*2)) | 100 |
| Comp. Ex. 5 | — | — | — | — |
| Comp. Ex. 6 | — | — | — | — |
| Comp. Ex. 7 | — | — | — | — |
| Comp. Ex. 8 | Sumibright M574 (Sumitomo Chem.) | 5.3 | ABS 15 (JSR) | 94.7 |
| Comp. Ex. 9 | — | — | ABS 15 (JSR) | 94.2 |
| Comp. Ex. 10 | Sumibright M574 (Sumitomo Chem.) | 97.4 | — | — |
| Comp. Ex. 11 | Sumibright M574 (Sumitomo Chem.) | 98.7 | — | — |
| Comp. Ex. 12 | Sumibright M574 (Sumitomo Chem.) | 98.7 | — | — |
| Comp. Ex. 13 | Sumibright M574 (Sumitomo Chem.) | 100 | — | — |
| Comp. Ex. 14 | — | — | — | — |

TABLE 5-continued

Composition of vibration damper
Binder resin (100 parts by weight)

| | PC resin | | PPE resin | | PP resin | |
|---|---|---|---|---|---|---|
| | Kind | Content (% by weight) | Kind | Content (% by weight) | Kind | Content (% by weight) |
| Comp. Ex. 3 | — | — | — | — | — | — |
| Comp. Ex. 4 | — | — | — | — | — | — |
| Comp. Ex. 5 | Novalex 7025A | 100 | — | — | — | — |
| Comp. Ex. 6 | — | — | Noryl *4) | 100 | — | — |
| Comp. Ex. 7 | — | — | — | — | K6014 (Chisso) | 100 |
| Comp. Ex. 8 | — | — | — | — | — | — |
| Comp. Ex. 9 | — | — | — | — | — | — |
| Comp. Ex. 10 | — | — | — | — | — | — |
| Comp. Ex. 11 | — | — | — | — | — | — |
| Comp. Ex. 12 | — | — | — | — | — | — |
| Comp. Ex. 13 | — | — | — | — | — | — |
| Comp. Ex. 14 | Novalex 7025A | 100 | — | — | — | — |

Composition of vibration damper

| | Binder resin (100 parts by weight) | | Inorganic filler | |
|---|---|---|---|---|
| | Kind | Content (wt %) | Kind | Content (part by weight) |
| Comp. Ex. 3 | — | — | — | — |
| Comp. Ex. 4 | — | — | — | — |
| Comp. Ex. 5 | — | — | — | — |
| Comp. Ex. 6 | — | — | — | — |
| Comp. Ex. 7 | — | — | — | — |
| Comp. Ex. 8 | — | — | Granular magnetite (particle diameter: 0.27 μm) | 5.3 |
| Comp. Ex. 9 | VS-1 (Kuraray) | 5.8 | Granular magnetite (particle diameter: 0.27 μm) | 38.9 |
| Comp. Ex. 10 | VS-1 (Kuraray) | 2.6 | — | — |
| Comp. Ex. 11 | VS 1 (Kuraray) | 1.3 | — | — |
| Comp. Ex. 12 | VS-1 (Kuraray) | 1.3 | — | — |
| Comp. Ex. 13 | — | — | Granular magnetite (particle diameter: 0.29 μm) | 4.0 |
| Comp. Ex. 14 | — | — | Strontium ferrite plates (plate diameter: 1.2 μm) | 11.1 |

TABLE 5-continued

| | Composition of vibration damper Inorganic filler Mica | | Properties of vibration damper | | |
|---|---|---|---|---|---|
| | | | | Bending modulus of elasticity | |
| | Kind | Content (part by weight) | Loss factor *1) | Measured values (kgf/cd) | Relative values (%) | Specific gravity |
| Comp. Ex. 3 | — | — | 0.009 | 26700 | 100 | 1.05 |
| Comp. Ex. 4 | — | — | 0.010 | 25000 | 100 | 1.05 |
| Comp. Ex. 5 | — | — | 0.008 | 21800 | 100 | 1.19 |
| Comp. Ex. 6 | — | — | 0.010 | 25000 | 100 | 1.06 |
| Comp. Ex. 7 | — | — | 0.012 | 12500 | 100 | 0.90 |
| Comp. Ex. 8 | — | — | 0.011 | 26100 | 98 | 1.09 |
| Comp. Ex. 9 | — | — | 0.050 | 15100 | 60 | 1.50 |
| Comp. Ex. 10 | — | — | 0.013 | 25300 | 95 | 1.05 |
| Comp. Ex. 11 | Flaky mica (plate diameter: 150 μm) | 5.3 | 0.012 | 26500 | 99 | 1.08 |
| Comp. Ex. 12 | Flaky mica (plate diameter: 150 μm) | 11.1 | 0.013 | 23500 | 88 | 1.11 |
| Comp. Ex. 13 | — | — | 0.010 | 26000 | 97 | 1.08 |
| Comp. Ex. 14 | — | — | 0.008 | 21500 | 99 | 1.29 |

*1) Measuring conditions: 24° C., 1 kHz
*2) JSR: Produced by Japan Synthetic Rubber Co., Ltd.
*3) Produced by Mitsubishi Chemical Co., Ltd.
*4) Produced by Japan G.E. Plastic Co., Ltd.

What is claimed is:

1. A damping material consisting essentially of:
   100 parts by weight of a binder resin comprising as a base resin, 85 to 99% by weight of at least one resin selected from the group consisting of polypropylenes, polystyrenes, acrylonitrile-butadiene-styrene copolymers, polycarbonates, polyphenylene ethers and modified polyphenylene ethers, and 1 to 15% by weight of styrene-isoprene-styrene block copolymer having a number-average molecular weight of 30,000 to 300,000, and
   1 to 20 parts by weight, based upon 100 parts by weight of the binder resin, of iron compound particles having particle size of 0.05 to 10 μm,
   said damping material having a loss factor of not less than 0.015 at 24° C., a relative bending modulus of not less than 70% based on a bending modulus of a damping material consisting of the base resin, and a specific gravity of 0.95 to 1.30.

2. A damping material consisting essentially of:
   100 parts by weight of a binder resin comprising 85 to 99% by weight oat least one base resin selected from the group consisting of polypropylenes, polystyrenes, acrylonitrile-butadiene-styrene copolymers, polycarbonates, polyphenylene ethers and modified polyphenylene ethers, and 1 to 15% by weight of styrene-isoprene-styrene block copolymer having a number-average molecular weight of 30,000 to 300,000, and 1 to 20 parts by weight, based upon 100 parts by weight of the binder resin, of iron compound particles having particle size of 0.05 to 10 μm, and which further contain a compatibilizing agent, an oxidation stabilizer or a polymer selected from the group consisting of natural rubbers, isoprene rubbers, butadiene rubbers, styrene-butadiene rubbers, ethylene-propylene-diene terpolymers, ethylene-propylene rubbers, styrene-conjugated diene block copolymers and hydrogenation products thereof, said damping material having a loss factor of not less than 0.015 at 24° C., a relative bending modulus of not less than 70% based on a bending modulus of a damping material consisting of the base resin, and a specific gravity of 0.95 to 1.30.

3. A method of producing a damping material consisting essentially of:

100 parts by weight of a binder resin comprising 85 to 99% by weight of at least one base resin selected from the group consisting of polypropylenes, polystyrenes, acrylonitrile-butadiene-styrene copolymers, polycarbonates, polyphenylene ethers and modified polyphenylene ethers, and 1 to 15% by weight of styrene-isoprene-styrene block copolymer having a number-average molecular weight of 30,000 to 300,000, and 1 to 200 parts by weight, based upon 100 parts by weight of the binder resin, of iron compound particles having particle size of 0.05 to 10 μm, said damping material having a loss factor of not less than 0.015 at 24° C., a relative bending modulus of not less than 70% based on a bending modulus of a damping material consisting of the base resin, and a specific gravity of 0.95 to 1.30, for use in a structural material of electrical or electronic equipment, a casing or body of household electric appliances or office automation equipments.

4. A method of forming a structural material of an electrical or electronic equipment, a casing or body of household electric appliances or office automation equipment, the method comprising forming a damping material consisting essentially of:

100 parts by weight of a binder resin comprising 85 to 99% by weight of at least one base resin selected from the group consisting of polypropylenes, polystyrenes, acrylonitrile-butadiene-styrene copolymers, polycarbonates, polyphenylene ethers and modified polyphenylene ethers, and 1 to 15% by weight of styrene-isoprene-styrene block copolymer having a number-average molecular weight of 30,000 to 300,000, and 1 to 20 parts by weight, based upon 100 parts by weight of the binder resin, of iron compound particles having particle size of 0.05 to 10 μm, said damping material having a loss factor of not less than 0.015 at 24° C., a relative bending modulus of not less than 70% based on a bending modulus of a damping material consisting of the base resin, and a specific gravity of 0.95 to 1.30.

5. A damping material according to claim 1, wherein the iron compound particles are hematite particles, maghemite particles, magnetite particles, berthollide compound particles, barium ferrite particles, strontium ferrite particles, goethite particles, akaganeite particles or lepidocrocite particles.

6. A damping material according to claim 1, wherein the base resin is at least one resin selected from the group consisting of polystyrenes, acrylonitrile-butadiene-styrene copolymers, polycarbonates, polyphenylene ethers and modified polyphenylene ethers.

7. A damping material according to claim 1, wherein the content of the base resin is 88 to 98% by weight, the content of styrene-isoprene-styrene block copolymer is 2 to 12% by weight, and the content of iron compound particles is 3 to 20 parts by weight based on 100 parts by weight of the binder resin.

8. Masterbatch pellets for a damping material, comprising 100 parts by weight of binder resin composed of not more than 70% by weight of at least one resin selected from the group consisting of polypropylenes, polystyrenes, acrylonitrile-butadiene-styrene copolymers, polycarbonates, polyphenylene ethers and modified polyphenylene ethers and not less than 30% by weight of styrene-isoprene-styrene block copolymer having a number-average molecular weight of 30,000 to 300,000, and 50 to 300 parts by weight, based upon 100 parts by weight of the binder resin, of iron compound particles having a particle size of 0.05 to 10 μm.

9. A structural material for electrical or electronic equipment, a casing or body of a household electric appliance or office automation equipment made of the damping material of claim 1.

10. A damping material according to claim 1, wherein the content of the polymer is not more than 30 parts by weight based on 100 parts by weight of the binder resin.

11. A damping material according to claim 1, wherein the content of the iron compound particles is 3 to 11.1 parts by weight based on 100 parts by weight of the binder resin.

12. A method of forming a cartridge half, cassette half or disk shell using a damping material having a loss factor of not less than 0.015 at 24° C., a relative bending modulus of not less than 70% based on a bending modulus of a damping material consisting of the base resin, and a specific gravity of 0.95 to 1.30, said damping material consisting essentially of:

100 parts by weight of a binder resin comprising 85 to 99% by weight of at least one base resin selected from the group consisting of polypropylenes, polystyrenes, acrylonitrile-butadiene-styrene copolymers, polycarbonates, polyphenylene ethers and modified polyphenylene ethers, and 1 to 15% by weight of styrene-isoprene-styrene block copolymer having a number-average molecular weight of 30,000 to 300,000, and 1 to 20 parts by weight, based upon 100 parts by weight of the binder resin, of iron compound particles having particle size of 0.05 to 10 μm.

* * * * *